United States Patent
Shima et al.

(10) Patent No.: US 9,823,167 B2
(45) Date of Patent: Nov. 21, 2017

(54) TIRE AIR PRESSURE MONITORING SYSTEM

(75) Inventors: Takashi Shima, Milton Keynes (GB); Kazuo Sakaguchi, Ebina (JP); Syoji Terada, Hiratsuka (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 310 days.

(21) Appl. No.: 14/117,067

(22) PCT Filed: Feb. 20, 2012

(86) PCT No.: PCT/JP2012/053975
§ 371 (c)(1),
(2), (4) Date: Feb. 25, 2014

(87) PCT Pub. No.: WO2012/157307
PCT Pub. Date: Nov. 22, 2012

(65) Prior Publication Data
US 2014/0150543 A1 Jun. 5, 2014

(30) Foreign Application Priority Data
May 13, 2011 (JP) .................................. 2011-108053

(51) Int. Cl.
*G01M 17/02* (2006.01)
*B60C 23/04* (2006.01)

(52) U.S. Cl.
CPC .............. *G01M 17/02* (2013.01); *B60C 23/04* (2013.01); *B60C 23/0416* (2013.01); *B60C 23/0459* (2013.01); *B60C 23/0488* (2013.01); *B60C 23/0489* (2013.01)

(58) Field of Classification Search
CPC .................................................... B60C 23/04
See application file for complete search history.

(56) References Cited

U.S. PATENT DOCUMENTS 6,112,587 A * 9/2000 Oldenettel .......... B60C 23/0416
340/445
8,943,882 B2 2/2015 Shima et al.
2005/0248446 A1 11/2005 Watabe et al.
(Continued)

FOREIGN PATENT DOCUMENTS

JP 2005-321958 A 11/2005
JP 2006-138803 A 6/2006
(Continued)

OTHER PUBLICATIONS

Communication with Extended European Search Report dated Mar. 2, 2015 from the corresponding European Patent Application No. 12786260.5.

*Primary Examiner* — R. A. Smith
*Assistant Examiner* — Herbert K Roberts
(74) *Attorney, Agent, or Firm* — Young Basile Hanlon & MacFarlane, P.C.

(57) ABSTRACT

Provided is a tire air pressure transmission device configured to determine the rotational position of the tire air pressure transmission device based on a gravitational acceleration component of a centrifugal acceleration at the time of transmission of the tire air pressure information and to transmit in a wireless signal and at a prescribed cycle, tire air pressure information and tire air pressure transmission device rotational position information.

5 Claims, 8 Drawing Sheets

(56) References Cited

U.S. PATENT DOCUMENTS

| | | | |
|---|---|---|---|
| 2008/0062004 A1* | 3/2008 | Hammerschmidt | ............... B60C 23/0408 340/870.01 |
| 2012/0116607 A1 | 5/2012 | Guinart | |
| 2014/0172241 A1 | 6/2014 | Shima et al. | |

FOREIGN PATENT DOCUMENTS

| | | | | |
|---|---|---|---|---|
| JP | 2010-122023 A | | 6/2010 | |
| JP | 2010122023 A | * | 6/2010 | ............ G01L 17/00 |
| MX | 2013011817 A | | 12/2013 | |
| MX | 2013011757 A | | 2/2014 | |
| WO | 2011006619 A2 | | 1/2011 | |

* cited by examiner

S1: Input TPMS data

S2: Calculate rotational position

S3: Calculate dispersion characteristic value

S4: TPMS data received 10 times or more?

S5: Maximum value >0.57 AND Other values <0.37 ?

S6: Determine wheel position

S7: Cumulative travel time elapsed 8 min.?

TIRE AIR PRESSURE MONITORING SYSTEM

CROSS-REFERENCE TO RELATED APPLICATION

This national stage application claims priority to Japanese Patent Application No. 2011-108053 filed on May 13, 2011, which is incorporated herein in its entirety.

TECHNICAL FIELD

The present invention relates to a tire air pressure monitoring system

BACKGROUND

In a tire air or pneumatic pressure monitoring device described in Japanese Patent Application Publication No. 2010-122023, TPMS (tire pressure monitoring system) data is transmitted at a time at which an acceleration in a rotational direction of a TPMS sensor installed on each wheel reaches "1" [G] or "−1" [G] so that a TPMS sensor transmits the TPMS data at a constant rotational position of a wheel. A TPMS control unit installed on a side of a vehicle body determines a wheel position of the TPMS sensor based on the number of teeth that are acquired from a chain of wheel speed pulses detected by a wheel speed sensor at a timing at which the TPMS data has been received.

However, in this conventional technique, in order to detect that the TPMS sensor has reached a predetermined rotational position, it is necessary to shorten the sampling period or cycle. Thus, there has been a problem of difficulty in extending a lifetime of a battery of the TPMS sensor (tire air pressure transmission device).

BRIEF SUMMARY

The objective of the present invention resides in providing a tire air pressure monitoring system which may suppress the power consumption of the tire air pressure transmission device.

In order to achieve the objective, according to the present invention, determination is made of a rotational position of the tire air pressure transmission device based on a gravitational acceleration component of a centrifugal acceleration when tire air pressure information is transmitted, and at a predetermined period or cycle, both the tire air pressure information and the rotational position information are configured to be transmitted in a wireless signal.

Consequently, according to the present invention, the power consumption of the tire air pressure transmission device may be suppressed.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
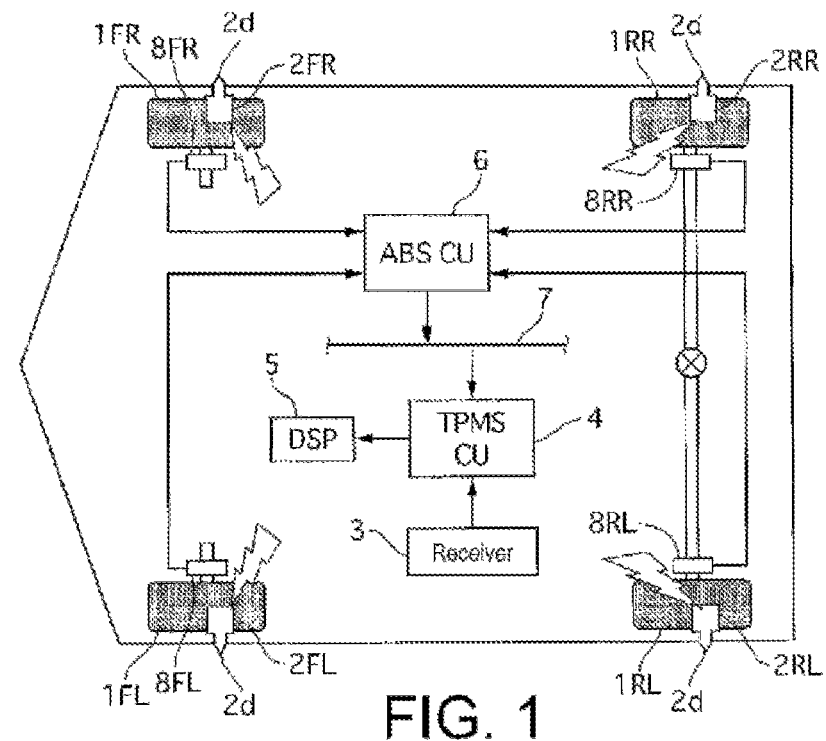
FIG. 1 is a configuration diagram illustrating a configuration of the tire air pressure monitoring device in a first embodiment.

FIG. 1 is a configuration diagram illustrating a tire air or pneumatic pressure monitoring system 13 in a first embodiment. In this figure, the end letters annexed to each reference sign is intended to indicate as follows: FL stands for the left front wheel, FR stands for the right front wheel, RL stands for the left rear wheel, and RR stands for the right rear wheel, respectively. In the following description, when not specifically necessary, the description of FL, FR, RL and RR will be omitted.

The tire air pressure monitoring device 13 in the first embodiment is provided with TPMS (Tire Pressure Monitoring System) sensors 2 and a TPMS main unit 14. The TPMS main unit 14 is provided with a receiver 3, a TPMS control unit 4, a display 5, and an ABS (Antilock Brake System) control unit 6, and a wheel speed sensors 8.

Figure 2:
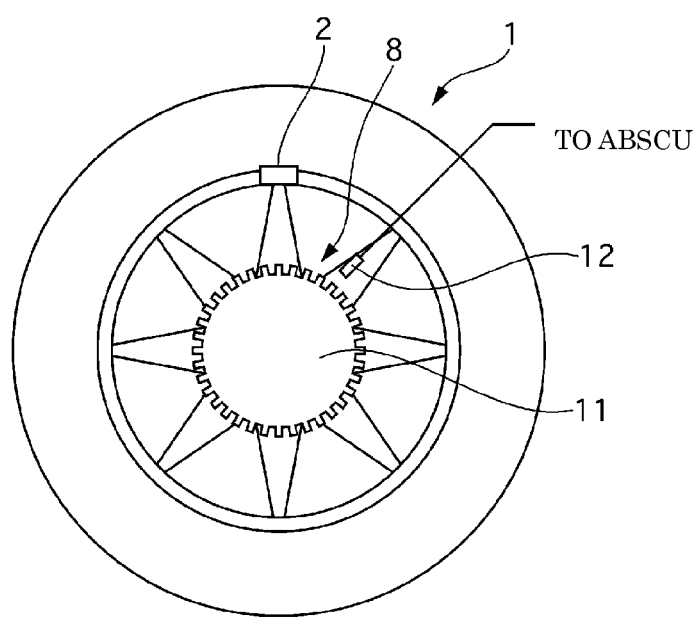
FIG. 2 is a schematic diagram illustrating a wheel in the first embodiment.

FIG. 2 shows a wheel 1. As shown in FIG. 2, the TPMS sensor 2 is installed on each of the wheels 1 at an air valve position near the outer circumferential side of the wheel 1.

Figure 3:
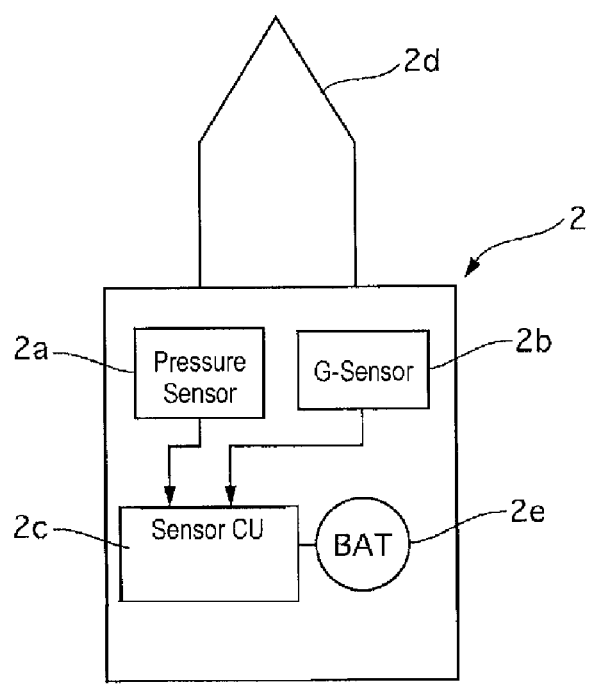
FIG. 3 is a configuration diagram of a TPMS sensor in the first embodiment.

FIG. 3 is a configuration diagram of the TPMS sensor 2. The TPMS sensor 2 comprises a pressure sensor 2a, an acceleration sensor 2b, a sensor control unit 2c, a transmitter 2d, and a button battery 2e.

The pressure sensor 2a detects a tire air pressure. The acceleration sensor 2b detects the acceleration in the centrifugal direction (centrifugal acceleration) [G] acting on the wheel. The sensor control unit 2c operates by the power supplied from the button battery 2e, and receives tire air pressure information from the pressure sensor 2a and centrifugal acceleration information from the acceleration sensor 2b, respectively. In addition, the TPMS data containing the air pressure information of the tire and a sensor ID (the identification information) that is previously set and unique to each TPMS sensor 2 is sent in a wireless signal from the transmitter 2*d*. In the first embodiment, the sensor IDs are defined by 1 to 4 associated with each of the TPMS sensors 2.

The sensor control unit 2*c* compares the acceleration in the centrifugal direction detected by the acceleration sensor 2*b* with a preset threshold for determination of a vehicle running state. When the centrifugal acceleration is less than the running determination threshold, a determination is made that the vehicle is being stopped or stationary, so that transmission of the TPMS data is stopped. On the other hand, when the centrifugal acceleration exceeds the running determination threshold, a determination is made that the vehicle is running, and the TPMS data will be transmitted at a prescribed time The wheel speed sensor 8 is composed of a rotor 11 and a sensing part 12. As shown in FIG. 2, the rotor 11 is formed in a gear shape and is fixed coaxially to the center of rotation of the wheel 1 to be rotatable integrally. Faced on the protrusion surface of the rotor 11, the sensing part 12 is provided. The sensing part 12 is composed of a permanent magnet and a coil. As the rotor rotates, the concave-convex or protrusion surface of the rotor crosses the magnetic field formed on the periphery of the wheel speed sensor 8, so that the magnetic flux density varies to generate an electromotive force in the coil, and such a variation in the voltage is output as the wheel speed pulse signal to the ABS control unit 6.

The rotor 11 is made up of 48 teeth so that the sensing part 12 is configured to output a chain of pulses 48 times every time the wheel 1 rotates once.

The ABS control unit 6 receives a change of wheel speed pulse signals from each wheel speed sensor 8 to count the number of pulses to determine the wheel speed of each wheel 1 based on a change in the number of pulses in a predetermined time. When detected a locking tendency of a wheel 1 based on the wheel speed of each wheel 1, an anti-skid brake control is carried out by adjusting or holding a wheel cylinder pressure of that wheel to suppress the locking tendency by operating an ABS actuator not shown. Further, the ABS control unit 61 outputs a count value of the wheel speed pulses to a CAN communication line 7 at a constant interval (for example, every 20 msec.). The receiver 3 receives a wireless signal output from each TPMS sensor to decode and output to the TPMS control unit 4.

The TPMS control unit 4 receives TPMS data from each TPMS sensor decoded in the receiver 3. The TPMS control unit 4 stores a correspondence relationship between each sensor ID and each wheel position in a nonvolatile memory 4*d* (see FIG. 7), and with reference to the correspondence relationship storing the sensor ID of the TPMS data, determines to which wheel position the TPMS data is corresponding. The tire air pressure contained in the TPMS data will be displayed on the display 5 as the air pressure corresponding to the wheel position. When the tire air pressure falls below the lower limit value, the decrease in tire air pressure will be informed to a driver by changing in display color, blinking indication or alarm sound.

As described above, based on the correspondence relationship between the sensor ID and the wheel position stored in the memory 4*d*, the TPMS control unit 4 determines to which wheel the received TPMS data belong. However, when a tire rotation is carried out while the vehicle stops, the correspondence relationship between the sensor ID and the wheel position stored in the memory 4*d* is not in agreement with the actual correspondence relationship, and it is impossible to find out to which wheel the TPMS data belong so that one cannot tell with which wheel the TPMS data is associated. Here, the "tire rotation" refers to the operation of swapping the installing wheel positions of the tires so as to ensure an even tread wear of the tires and, thus, to prolong the service lifetime (the tread lifetime). For example, for a passenger vehicle, usually the front/rear wheel tires are swapped while the left/right wheel tires.

Therefore, it is necessary to update the correspondence relationship between each sensor ID and each wheel position stored in memory 4*d* after the tire rotation. However, since a mutual communication between the TPMS sensor 2 installed on the wheel 1 and the TPMS control unit 4 installed on the vehicle body, in the tire air pressure monitoring system in the first embodiment, a protocol of the memory 4*d* at the update is previously set.

When the vehicle stop determination time is equal to or greater than 15 minutes, the TPMS sensor 2 determines that the tire rotation may have been carried out.

When the vehicle stop determination time is less than 15 minutes, it is determined that no updating of the memory 4*d* is required and a "normal mode" is selected. When the vehicle stop determination time is equal to or greater than 15 minutes, it is determined that updating of the memory 4*d* is necessary and a "position transmission mode" will be selected.

The sensor control unit 2*c* determines a vehicle stop when the centrifugal acceleration detected by the acceleration sensor 3*b* is less than a vehicle running determination threshold value and stops to transmit the TPMS data. On the other hand, when the centrifugal acceleration is less than the vehicle running threshold value, a vehicle running state is determined and TPMS data will be transmitted in a constant period (at every one min., for example).

In the position transmission mode, with a shorter interval (with interval of 10 sec. for example) than the transmission period of a fixed position transmission mode and when the TPMS sensor 2 reaches a fixed rotational position (a top position of the wheel 1), TPMS data is broadcast with a gravitational acceleration component at the time of the transmission process added.

The position transmission mode is executed until the number of transmission of the TPMS data reaches a prescribed number of times (e.g., 40 rounds). When the number of times of the transmission reaches 40 times, the position transmission mode transfers to a normal mode. When a determination has been made that the vehicle stops during the fixed position transmission mode and the vehicle stop determination time is less than 15 [min.], counting of the transmission of the TPMSS data will be continued upon restart. When the vehicle stop determination time is equal to or greater than 15 min., upon restart, the count of the TPMS data prior to the vehicle stop is reset and counting of the transmission is carried out.

The TPMS sensor transmits, as described above, TPMS data with the gravitational acceleration component added to the TPMS data.

Figure 4A:
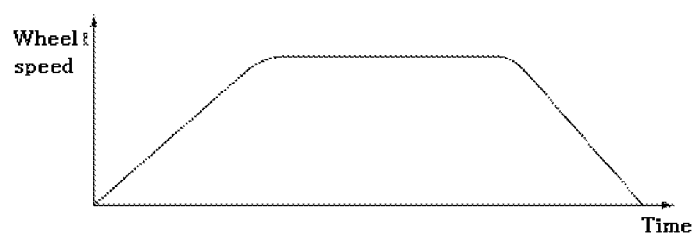
FIG. 4A is a graph illustrating changes in a wheel speed in the first embodiment in the first embodiment.
Figure 4B:
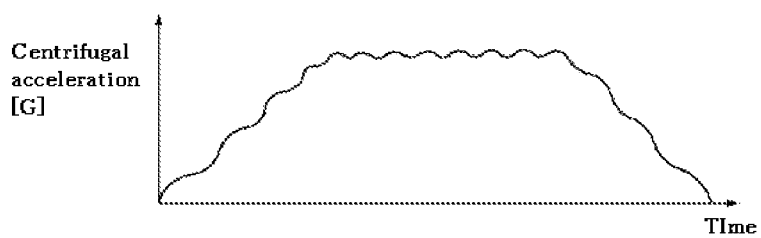
FIG. 4B is a graph illustrating changes in centrifugal acceleration in the first embodiment in the first embodiment.
Figure 4C:
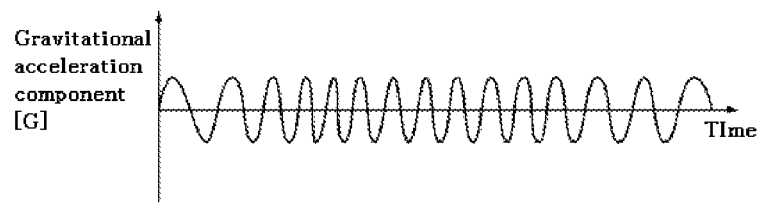
FIG. 4C is a graph illustrating changes in a gravitational acceleration component in the first embodiment in the first embodiment.
Figure 4D:
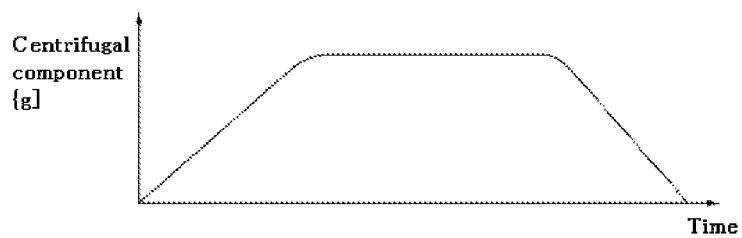
FIG. 4D is a graph illustrating changes in a centrifugal component in the first embodiment in the first embodiment.

FIGS. 4A-4D are graphs illustrating changes in both the wheel speed and the centrifugal acceleration detected by the acceleration sensor 2*b*. FIG. 4A shows a wheel speed, FIG. 4B shows a centrifugal acceleration, FIG. 4C shows a gravitational acceleration component of the centrifugal acceleration, and FIG. 4D shows a graph illustrating a centrifugal component of the centrifugal acceleration, respectively.

The centrifugal acceleration may be divided into a centrifugal component that generates due to a centrifugal force produced in accordance with rotation of the wheel 1 and a gravitational acceleration component that generates due to a gravitational acceleration.

The centrifugal acceleration exhibits a waviness profile, but changes so as to follow the wheel speed as shown in FIG. 4A as a whole. As shown in FIG. 4D the centrifugal force component develops substantially in synchronization with the wheel speed. On the other hand, the gravitational acceleration component becomes a sine wave that travels back and forth between −1 [G] and +1 [G], as shown in FIG. 4C, the period thereof becomes shorter as the wheel speed increases. This is because, when the TPMS sensor 2 comes to the top point of the wheel, the gravitational acceleration component reaches +1 [G], and, when it comes to the bottom or lowest point, the direction of the TPMS sensor 2 is the opposite from that at the top point with "−1" [G] being detected. At a 90 degree position with respect to the top and bottom points, it becomes "0" [G]. In other words, the rotational position of the TPMS sensor 2 may be acquired based on the gravitational acceleration component.

In order to transmit TPMS data when the TPMS sensor 2 has reached a prescribed position, the gravitational acceleration component has to be sampled on a continuous basis. In addition, to enhance the positional accuracy, the sampling period has to be shortened. This would increase power consumption so that the lengthening the battery lifetime cannot be achieved.

Thus, in the first embodiment, in a position transmission mode, the TPMS data is added with position information at the time of the transmission process. The position information is such information which indicates to which of eight zones the TPMS sensor belongs when a single rotation is divided in eight zones. More specifically, a sine curve of the gravitational acceleration component is divided into eight zones and the positional information is acquired by identifying the zone in which a detected gravitational acceleration component is positioned.

Figure 5:
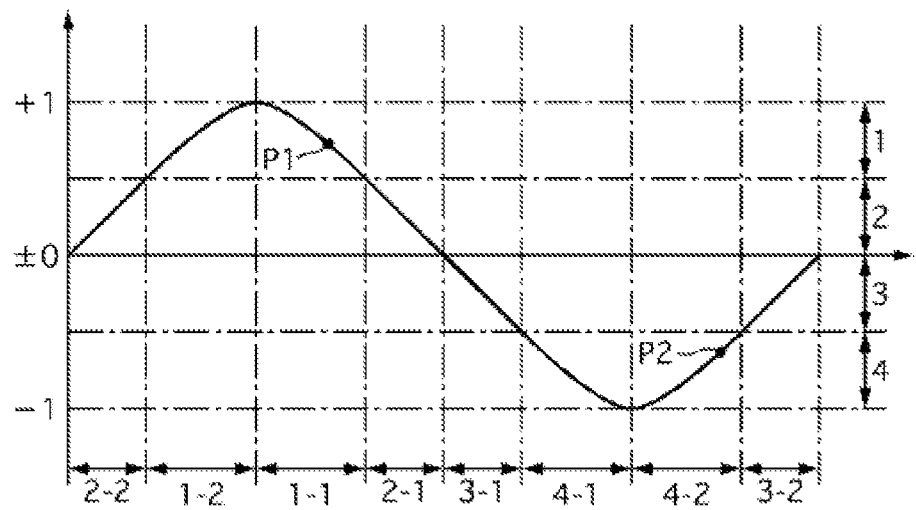
FIG. 5 is a diagram illustrating zoning of the gravitational acceleration component in the first embodiment.

FIG. 5 is a diagram describing the zoning operation of the gravitational acceleration component. As shown in FIG. 5, depending on the magnitude of the gravitational acceleration component, four zones are created. Specifically, the zone 1 is set where the gravitational acceleration component ranges between +0.5 [G] and 1 [G], zone 2 is set where the gravitational acceleration component between ±0 [G] and less than +0.5 [G], zone 3 with a range between −0.5 [G] and ±0 [G], zone 4 with a range greater than −1 [G] and less than −0.5 [G], respectively. Further, the range where the gravitational acceleration component decreases is defined as a sub-zone 1 whereas the range where the gravitational acceleration component increases is defined as a sub-zone 2. For example, the point P1 in FIG. 5 is represented by zone 1-1, the point P2 is represented by zone 4-2, respectively.

Figure 6:
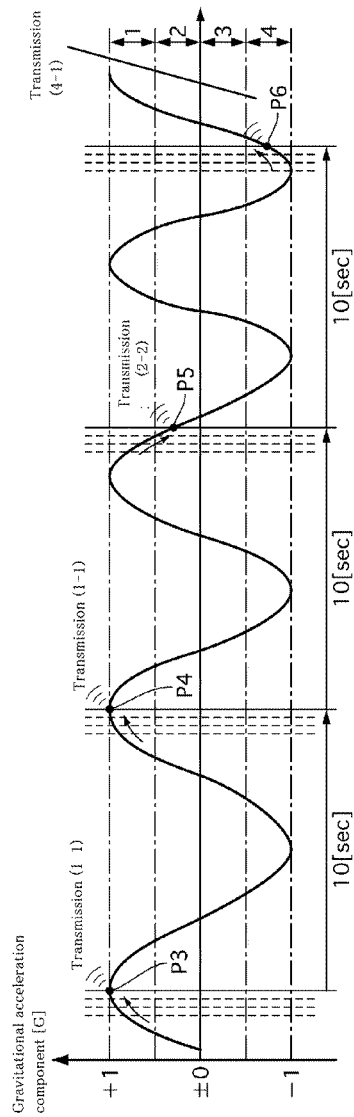
FIG. 6 is a diagram illustrating the content of information of the gravitational acceleration component in accordance with the gravitational acceleration component at the time of transmission in the first embodiment.

FIG. 6 shows a sample of contents of the gravitational acceleration component information in accordance with the gravitational acceleration component at the time of transmission. FIG. 6 indicates a gradual increase in the wheel speed as well as the shortening of the period of the gravitational acceleration component in accordance with the increase in wheel speed. Thus, the rotational position of the TPMS sensor at every 10 sec. is not constant.

The sensor control unit 2c starts sampling of the gravitational acceleration component immediately before the elapse of 10 sec. after the previous transmission. The sampling is made four times at a sufficiently short period or cycle. By sampling immediately before the transmission, both the magnitude of the gravitational acceleration component and the range of change (increase/decrease) at the time of transmission may be acquired and the zone is thus set.

For example, at points P3, P4 in FIG. 6, the magnitude of the gravitational acceleration component is discerned to be in zone 1 from the sampling immediately before transmission and is positioned in a sub-zone 2 because of being positioned in the increase zone, so that the gravitational acceleration information will be sent as zone 1-2. On the other hand, at point P5, since the magnitude of the gravitational acceleration component is classified into zone 2, and, because it is positioned in the decrease range, the gravitational acceleration information will be transmitted as zone 2-1. Further, at point P6, since the magnitude of the gravitational acceleration component is classified in zone 4 and because it is placed in the increasing range, sub-zone 2 is decided.

Thus, monitoring is performed only immediately before the transmission of the TPMS data, despite of shortening of the sampling period, the number of samplings may be maintained small as a whole so that the power consumption may be suppressed while enhancing the detection accuracy of the gravitational acceleration component.

The TPMS control unit 4 determines that there is a possibility that the tire rotation is performed when the vehicle stop determination time is 15 min. or more. It is determined that there is no need to update the memory 4d when the vehicle stop determination time is below 15 min. below and a "monitor mode" will be selected. The need to update the memory 4d is determined when the vehicle stop determination time is 15 min. or more and a "learning mode" will be selected.

During the monitoring mode, the TPMS control unit 4 receives a sensor ID of the TPMS data input from the receiver 3, and with reference to a correspondence relationship between each sensor ID and each wheel position stored in the nonvolatile memory 4d, determines which data of the wheel position that TPMS data belong. Then, the tire air pressure contained in the TPMS data will be displayed to the display 5 as the air pressure of the wheel 1. Further, when the air pressure of the tire falls below a lower limit, a driver is alerted to decrease in tire air pressure, a driver is informed of decrease in air pressure by changing display color, blinking display and alarm sound.

The learning mode is continued to be executed until the determination is made in which to which wheel position each TPMS sensor 2 belongs, or, a cumulative travel time (e.g. 8 minutes) from the start of the learning mode has elapsed. After completion of the learning mode, the control transfers to a monitoring mode.

Note that, even in the midst of the learning mode, since the TPMS data will be input from time to time, a display of the air pressure and thus an alert to decrease in air pressure will be made based on the correspondence relationship before the updating between each sensor ID and each wheel position stored in the memory 4d.

In the learning mode, the rotational position of each wheel is acquired at the time at which the position of the TPMS sensor 2 which has transmitted the TPMS data including a certain specific sensor ID based on the count value of the wheel speed pulses from the ABS control unit 6 and the time in which the TPMS data including that specific sensor ID is received.

In the position transmission mode, the TPMS sensor 2 transmits the TPMS data with the gravitational acceleration component information added. For example, although the rotational position of the wheel 1 on which the TPMS sensor 2 with ID1 agrees with the gravitational acceleration component information sent from the TPMS sensor, the rotational position of the other wheel 1 and the gravitational acceleration component information from the TPMS sensor 2 with ID1 do not match.

This is because, when the vehicle travels or runs, the rotation speed of each wheel 1 may be different from each other due to the difference in tracks between the outer and inner wheels, the lock and the slip of the wheels 1, and the difference in the air pressure of the tires. Even when the vehicle runs straight, as the driver still may make minute corrections on the steering wheel and there is a certain difference in the road surface between the left and right sides, the difference in the rotation speed still develops between the front and rear wheels, and between the left and right wheels.

Description is now made in detail of a wheel position determination control which takes place during the learning mode by the TPMS control unit 4. For simplicity of description, only the process for determining the wheel position of the TPMS sensor 2 with ID1 is described, the process of determining the position of the wheels of the other TPMS sensor 2 is performed in the same manner.

Figure 7:
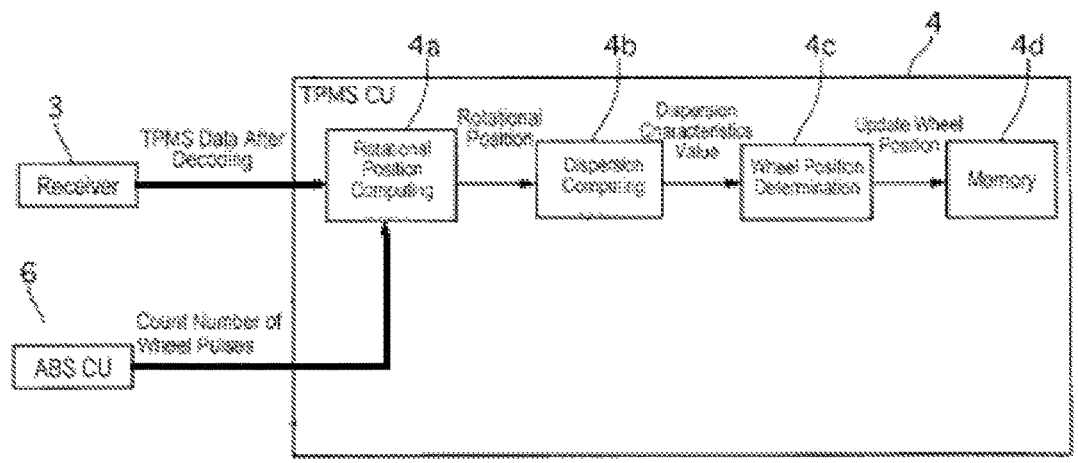
FIG. 7 is a control block diagram of a TPMS control unit in the first embodiment.

FIG. 7 is a control block diagram of the TPMS control unit 4 for executing the wheel position determination control. The TPMS control unit 4 has a rotational position calculation unit 4a, a dispersion calculation section 4b, a wheel position determination unit (the wheel position determination mechanism) 4c, and a memory 4d.

The rotational position calculation unit 4a receives the TPMS data after being decoded to be output from the receiver 3 and the count value of the wheel speed pulses output from the ABS control unit 6 to calculate a rotational position for each wheel when the rotational position of the TPMS sensor with ID1 has sent the TPMS data.

As described above, the rotor 11 has 48 teeth. However, the ABS control unit 6 only counts the wheel speed pulses, and is not in a position to identify each tooth. Thus, by hypothetically allocating a tooth number to each of 48 teeth by the rotational position calculation unit 4a and determines the rotational position of the wheel 1 based on the number of teeth allocated. Upon start of the learning mode, the rotational position calculation unit 4a accumulates and stores the count value of the wheel speed pulses input from the ABS control unit 6. The number of teeth may be acquired by adding 1 to a remainder after division of the cumulative value of the wheel speed pulses by the number of teeth 48.

There occurs a time delay between the time at which the TPMS sensor 2 with ID1 transmits the TPMS data and the time at which the receiver 3 receives the TPMS data. Further, a time delay also occurs between the TPMS sensor 2 with the ID1 has started a transmission process of the TPMS data and the time at which the TPMS data is actually transmitted.

Since the TPMS control unit 6 may not directly recognize the time at which the TPMS sensor has started the transmission, the time at which the TPMS sensor 2 has started transmission is estimated by calculating back from the time the receiver 3 received the TPMS data and it is necessary to calculate the rotational position of each wheel at that time.

In addition, the count value of the wheel speed pulses will only be received from the ABS control unit 6 at every 20 msec. In other words, since the count value at every single pulse is not input, it is necessary to calculate the number of teeth when the TPMS sensor 2 with ID1 has reached the top or highest point.

Figure 8:
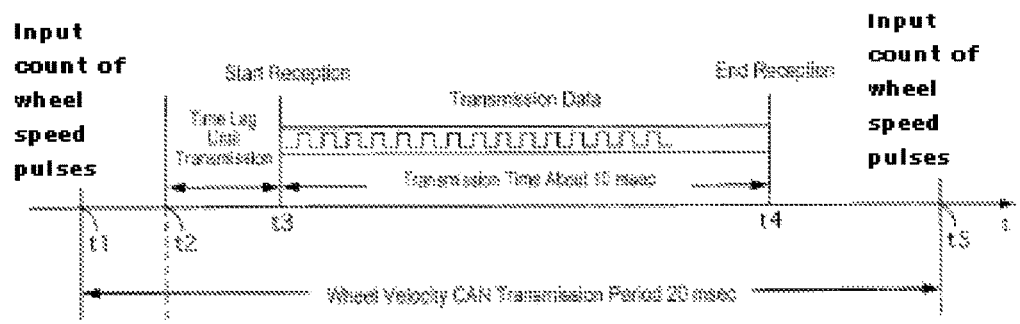
FIG. 8 is a diagram illustrating a method of the rotational position calculation of each wheel in the first embodiment.

FIG. 8 is a diagram describing a calculation method to obtain the number of teeth (rotational position of the wheel 1) of the rotor 11 when the TPMS sensor 2 has transmitted the TPMS data.

In FIG. 8, t1 represents the time when the count value of the wheel speed pulses is input; t2 represents the time when the rotational position of the TPMS sensor 2 with ID1 starts the transmission process of the TPMS data; t3 represents the time when the TPMS sensor 2 with ID1 actually starts the transmission of the TPMS data; t4 represents the time when the reception of the TPMS data is completed; and t5 represents the time when the count value of the wheel speed pulses is input. The TPMS control unit 6 directly knows the time t1, t4, and t5. The time t3 can be calculated by subtracting the data length (nominal value, e.g., about 10 msec.) of the TPMS data from the time t4; and t2 can be calculated by subtracting a time lag (previously available via experiment and the like) in the transmission. Within 20 msec., the change in the wheel speed is sufficiently small so that a constant speed is presumed.

Assuming the number of teeth n1 at time t1, the number of teeth n2 at time n2, and n5 at time t5, respectively, $(t2-t1)/(t5-t1)=(n2-n1)/(n5-n1)$ is established. Thus $n2-n1=(n5-n1)*(t2/(t5-t0))$.

The number of teeth n2 at the time t2 at which the rotational position of the TPMS sensor 2 with ID1 has reached the top point may be obtained by the following formula:

$$n2=n1+(n5-n1)*(t2-t1)/(t5-t1).$$

The dispersion calculation unit 4b accumulates the number of teeth of each wheel 1 calculated by the rotational position calculation unit 4a at the time t2 at which the TPMS sensor 2 with ID1 has started transmission of TPMS data, and calculates the dispersion degree in the rotational data of each wheel as the dispersion characteristic value.

Since the TPMS sensor 2 transmits the TPMS data at a fixed time, the rotational position at the start of the transmission process may vary each time. Thus, if the rotational position data of each wheel 1 is used as such, i.e., without correction, it is difficult to identify the wheel position of the TPMS sensor 2 with ID1 from the dispersion characteristic value. Therefore, the number of the teeth of the wheel 1 thus obtained will be subject to correction.

The correction of the rotational position of the wheel 1 is made by setting or allocating a correction value at each of the zones of the gravitational acceleration component information. The respective correction values are defined as stated below:

Zone 1-1: correction value 0
Zone 2-1; correction value +42
Zone 3-1: correction value +36
Zone 4-1: correction value +30
Zone 4-2: correction value +24
Zone 3-2: correction value +18
Zone 2-2: correction value +12
Zone 1-2: correction value +6

When corrections are made using these correction values, when the gravitational acceleration component information of the TPMS data transmitted by the TPMS sensor 2 with ID1 indicates zone 2-2, and the number of teeth of the wheel 1 that is acquired is 13, then the number of teeth after correction will be 25. When the number of teeth exceeds 48, remainder obtained by dividing by 48 will be set as the number of the teeth.

Figure 9:
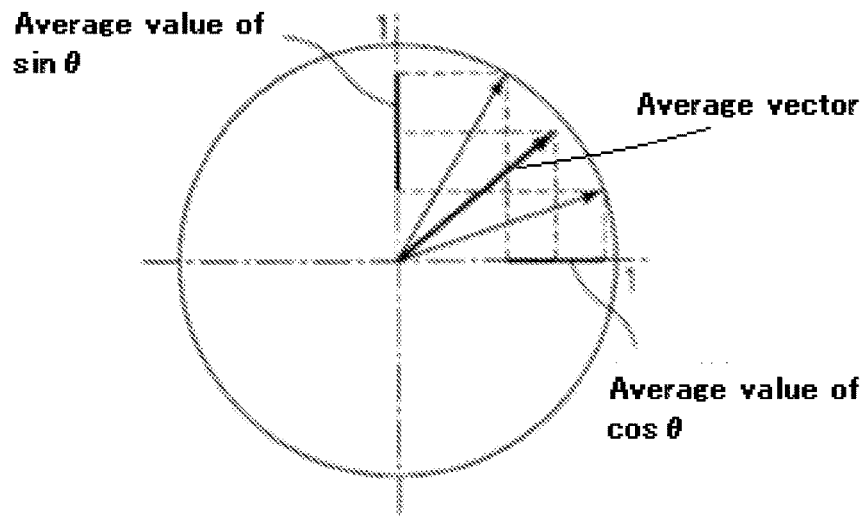
FIG. 9 is a diagram illustrating a calculating method of the dispersion characteristic value.

FIG. 9 is a diagram illustrating a method for calculating the dispersion characteristic value. According to the first embodiment, a unit circle (a circle with radius of 1) with the origin (0, 0) on the two-dimensional plane is assumed, and the rotational position θ degree (=360×the number of teeth of the rotor/48) of each wheel 1 is converted to the circumferential coordinates (cos θ, sin θ) on the unit circle. More specifically, the rotational position of each wheel 1 is calculated as follows: regarding a vector having the origin (0, 0) as the starting point and the coordinates (cos θ, sin θ) as the end with a length of 1, the average vectors (ave_cos θ, ave_sin θ) of each vector of the same rotational position data are obtained, and the scalar quantity of the average vector is calculated as the dispersion characteristic value X of the rotational position data: (cos θ, sin θ)=(cos((n2+1)*2π/48), sin((n2+1)*2π/48)).

Consequently, suppose the number of times of reception of the TPMS data with respect to the identical sensor ID as N (N is a positive integer), the average vectors (ave_cos θ, ave_sin θ) are expressed as follows: (ave_cos θ, ave_sin θ)=((Σ(cos θ))/N, (Σ(sin θ))/N).

The dispersion characteristic value X can thus be represented as follows: X=ave_cos θ2+ave_sin θ2.

The wheel position determination unit 4c works as follows. The dispersion characteristic values X of rotational position data of each wheel 1 is compared to each other, and when the greatest value of the dispersion characteristic values X is greater than a first threshold (e.g., 0.57) and the remaining 3 dispersion characteristic values X are all less than a second threshold (e.g., 0.37), a determination is made that the wheel 1 corresponding to the maximum dispersion characteristic value X is installed with the TPMS sensor 2 with ID1, and the correspondence relationship between the TPMS sensor with ID1 and the position of the wheel 1 is updated in the memory 4d.

Figure 10:
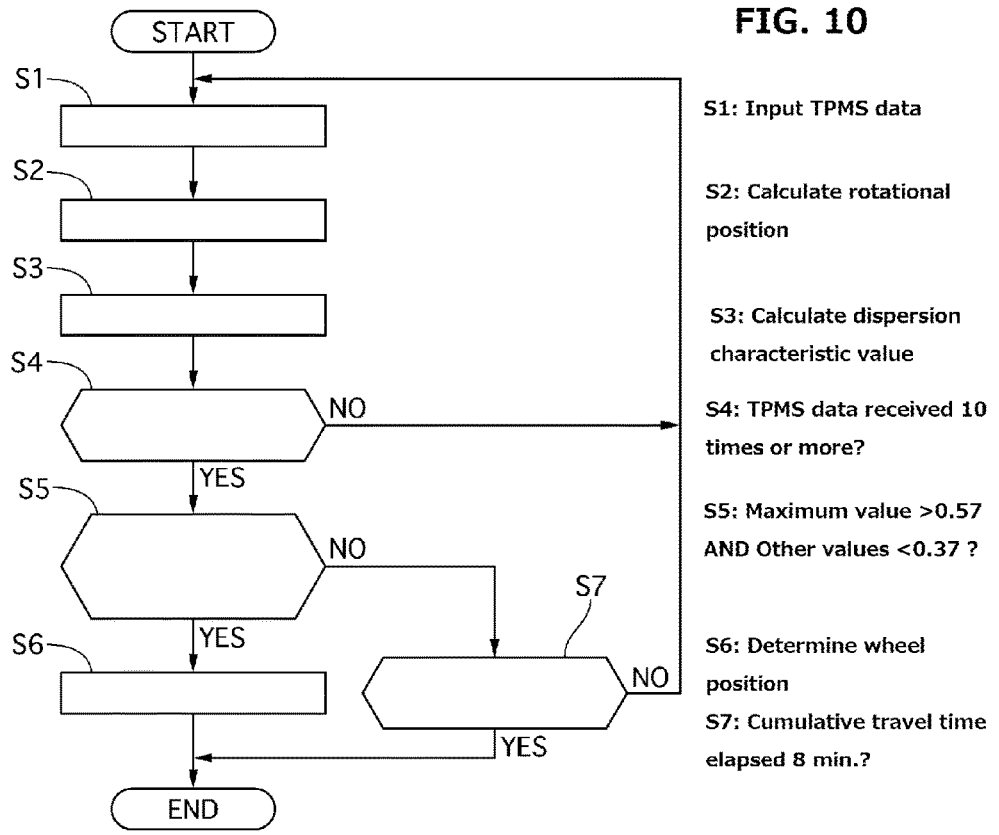
FIG. 10 is a flowchart illustrating a control process of the wheel position determination in the first embodiment.
Figure 11A:
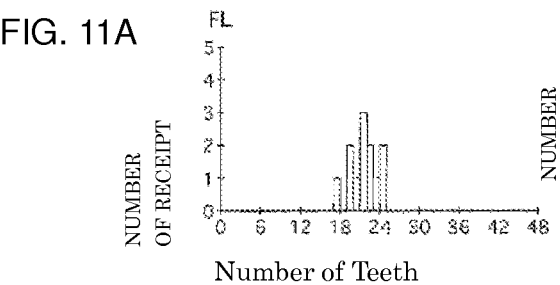
FIGS. 11A-11D are diagrams each illustrating a relationship between a rotational position (number of teeth) of each of the wheel and the number of receipt of TPMS data.
Figure 11B:
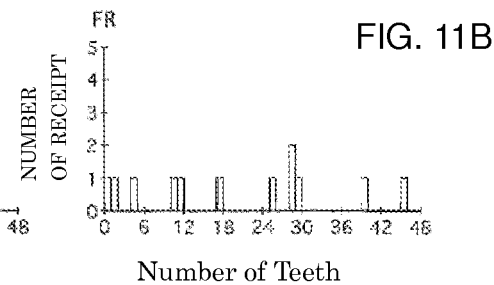
Figure 11C:
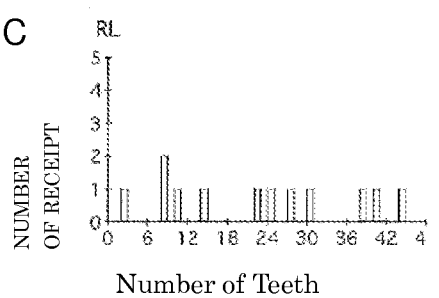
Figure 11D:
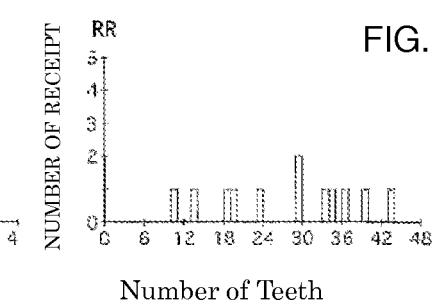

FIG. 10 is a flow chart illustrating the flow of the wheel position determination control process. In the following, respective steps of operation will be described. In the following description, the case of the sensor ID being "1" is assumed. However, for the other IDs (ID=2, 3, 4), the wheel position determination control process is also carried out in parallel.

In step S1, the rotational position calculation unit 4a receives the TPMS data with the sensor ID being 1. In step S2, the rotational position calculation unit 4a calculates the rotational position of each wheel 1. In step S3, the dispersion calculation unit 4b calculates the dispersion characteristic values X of the rotational position data of each wheel 1.

In step S4, a determination is made as to whether the TPMS data with sensor ID 1 are received for a prescribed number of times (e.g., 10 times) or more. If the determination result is YES, the operation goes to step S5. If the determination is NO, the operation returns to step S1.

In step S5, the wheel position determination section 4c determines whether the greatest or maximum value of the dispersion characteristics value is over the first threshold of 0.57, and whether the value of the remaining dispersion characteristic values are less than the second threshold of 0.37. If the determination is YES, the operation goes to step S6; if the determination result is NO, the operation goes to step S7.

In step S6, the wheel position determination section 4c determines the wheel position of the rotational position data corresponding to the maximum or highest dispersion characteristic value as the wheel position of the sensor ID1. Then, the learning mode ends.

In step S7, the wheel position determination section 4c determines whether a predetermined cumulative or accumulated running time (e.g., 8 min.) has elapsed from the start of the learning mode. If the determination result is YES, the learning mode is terminated. If the determination result is NO, the operation returns to step S1.

When the wheel position determination section 4c can determine the wheel positions for all of the sensor IDs within the prescribed accumulated travel time, the correspondence relationship between the sensor ID and the wheel position is updated and stored in the memory 4d for registration. On the other hand, when it has been impossible to determine the wheel position for all of the sensor IDs within the prescribed cumulative travel time, no updating takes place and the correspondence relationship between the sensor IDs and each wheel position currently stored in the memory 4d is continued to be used.

Now, description is made assuming that the wheel position of the TPMS sensor 2 with ID1 has been set to left front wheel 1FL as a result of the tire rotation.

Each TPMS sensor 2 works as follows: when the vehicle stop determination time immediately before the start of vehicle running is 15 min or more, a determination is made that there is a possibility that the tire rotation has been carried out, and the operation goes from the normal mode to the position transmission mode. In the position transmission mode, each TPMS sensor 2 transmits the TPMS data with the gravitational acceleration component information added every 10 sec.

On the other hand, when the vehicle stop determination time is 15 min. or more, the TPMS control unit 4 goes from the monitoring mode to the learning mode. In the learning mode, each time the TPMS data are received from each TPMS sensor 2, the TPMS control unit 4 calculates the rotational position (the number of teeth of the rotor) of each wheel 1 when the rotational position of the TPMS sensor 2 has reached the top point every time of receipt of the TPMS data from the TPMS sensor 2, based on the input time of the count value of the wheel speed pulses, the time of completion of receipt of the TPMS data, and the like. This is carried out repeatedly for 10 or more times and accumulated as the rotational position data. Among the rotational position data, the wheel position to which the rotational position data with least degree of dispersion is determined as the wheel position of that TPMS sensor 2.

As described above, when the vehicle travels or runs, the rotation speed of each wheel 1 may be different from each other due to the difference in tracks between the outer and inner wheels, the lock and the slip of the wheels 1. Thus, for example, although the rotational position of the wheel 1 to which the TPMS sensor with ID1 is installed agrees with the gravitational acceleration component sent from the TPMS sensor with ID1, the rotational position of the other wheel 1 does not coincide with the gravitational acceleration component sent from the TPMS sensor with ID1.

Thus, when correcting the rotational position of the wheel 1 on which the TPMS sensor 2 with ID1 is made based on the gravitational acceleration component information sent from the TPMS sensor 2 with ID1, it is true that the dispersion among the rotational position data will be small, but, when correction is made on the rotational position of other wheels 1 based on the gravitational acceleration component set from the TPMS sensor 2 with ID1, the dispersion of the rotational position data will be larger. By observing the dispersion degree of the rotational position of each wheel 1, the wheel position of each TPMS sensor 2 may be determined with accuracy.

FIGS. 11A-11D illustrate the relationship between the rotational positions (the number of teeth of the rotor 11) of the wheels 1FL, 1FR, 1RL, and 1RR when the rotational position of the TPMS sensor 2 with ID reaches the top point and the number of times of reception of the TPMS data. Here, FIG. 11A corresponds to the wheel speed sensor 8FL of the left front wheel 1FL, FIG. 11B corresponds to the wheel speed sensor 8FR of the right front wheel 1FR, FIG. 11C corresponds to the wheel speed sensor 8RL of the left rear wheel 1RL, and FIG. 11D corresponds to the wheel speed sensor 8RR of the right rear wheel 1RR.

As will be evident from FIGS. 11A-11D, whereas the dispersion degrees are high in the rotational positions (the number of teeth of the rotor 11) obtained from the wheel speed sensors 8FR, 8RL, and 8RR with respect to the right front wheel 1FR, the left rear wheel 1RL, and the right rear wheel 1RR, the dispersion degree of the wheel position obtained from the wheel speed sensor 8FL with respect to the left front wheel 1FL is the smallest or least, so that it is confirmed that the transmission period of the TPMS data with ID1 and the rotation period of the rotor 11 are substantially in synchronization. Thus, it may be determined that the position of the TPMS sensor 2 with ID1 is installed on the left front wheel 1FL.

The dispersion is generally defined by the average of the "square of the difference from the average or mean. However, since the rotational position of the wheel 1 is indicated by the angle data with periodicity, the dispersion degree of the rotational position cannot be determined using the general dispersion.

Thus, in the first embodiment, the dispersion calculation unit 4b works as follows. The rotational position θ of each wheel 1 obtained from each wheel speed sensor 8 is converted to the circumferential coordinates (cos θ, sin θ) of a unit circle having the origin (0, 0) at the center. The coordinates (cos θ, sin θ) are taken as vectors, the average vectors (ave_cos θ, ave_sin θ) of the vectors of the same rotational position data are acquired, and the scalar quantity of the average vector is calculated as the dispersion characteristic value X. As a result, it is possible to avoid the periodicity in determining the dispersion degree of the rotational position.

Figure 12:
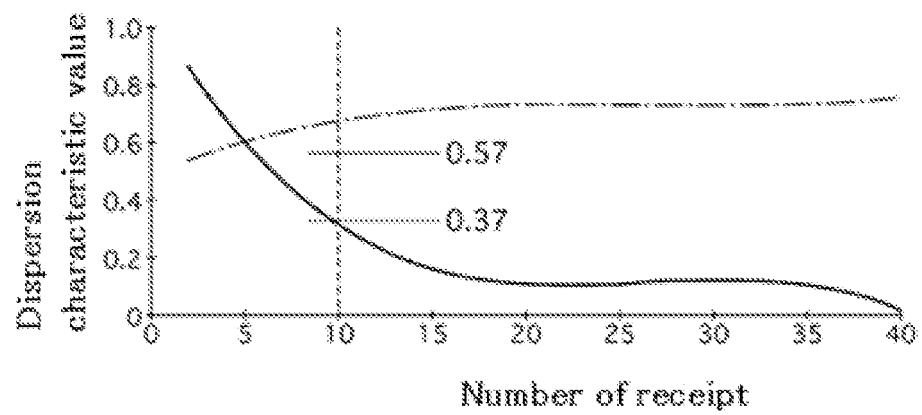
FIG. 12 is a diagram illustrating a change in the dispersion characteristic value X in accordance with the number of receipt of the TPMS data.

FIG. 12 shows a diagram illustrating a change in the dispersion characteristic value X in accordance with the number of receipt of the TPMS data for ID1. In FIG. 12, a dashed line denotes the dispersion characteristic value X of the left front wheel 1FL while a solid line denotes the dispersion characteristic value X of rotational position for the right front wheel 1FR, left rear wheel 1RL, right rear wheel 1RR.

As shown in FIG. 12, as the number of receipt of the TPMS data for the sensor ID1 increases, such a trend is indicated in which the dispersion characteristic X in the rotational position of the left front wheel 1FL approaches "1" while the dispersion characteristic values X for the right front wheel 1FR, left rear wheel 1RL, and right rear wheel 1RR approach "0". Thus, it may be ideal to select the maximum value (i.e. the dispersion characteristic value nearest to "1") at the attainment of sufficient number of receipt (about several ten times). However, since it is impossible to inform the driver of accurate tire state information during the wheel position determination period of the TPMS sensor 2, the prolonged determination time is not preferable. On the other hand, at the insufficient number of receipt (such as several times), no difference in the dispersion characteristic value X is noticeable, which would lead to decrease in determination accuracy.

Thus, in the tire air pressure monitoring system according to the first embodiment, the wheel position determination unit 4c compares, when the TPMS data for the same sensor ID ten times or more, the dispersion characteristic values X of the rotational position data of each wheel when the specific sensor ID has been transmitted. The wheel position determination unit 4c further detects that the maximum value of the dispersion characteristic values X exceeds a first threshold value 0.57 while the remaining three dispersion characteristic values fall below a second threshold value 0.37, then the wheel position of the rotational position data corresponding to the maximum dispersion characteristic value X will be identified as the wheel position of the TPMS sensor 2 with that sensor ID.

Not only through selection of the maximum value of the dispersion characteristic values, by comparing the maximum value with the first threshold value (0.57), a certain degree of determination accuracy may be ensured. In addition, by comparing the dispersion characteristic values other than the maximum value with the second threshold value (0.37), a predetermined difference (of 0.2 or more) can be confirmed, which further enhances the determination accuracy. Therefore, at a relatively small number of receipt such as ten times, both the determination accuracy and shortening of determination time may be achieved.

Upon transmitting TPMS data forty (40) times during the constant position transmission mode, the TPMS sensor 2 transfers to the normal mode. The TPMS sensor 2 consumes the power of the button battery 2e at the transmission of the TPMS data so that the battery life time of the button battery 2e will be shorter as the constant position transmission mode continues.

Thus, when each wheel position may not be determined despite the elapse of sufficient cumulative travel time, the constant position transmission mode will be terminated to transfer to the normal mode, which may suppress decrease in battery life time.

On the other hand, when the TPMS control unit 4 cannot determine the correspondence between each sensor ID and each wheel position despite elapsed time of cumulative travel of eight (8) minutes, the learning mode will be terminated and the process transitions to the monitoring mode. The total number of TPMS data is thirty (30) times or less when the cumulative travel time has passed eight minutes, the auto-learning mode may be terminated substantially in synchronization with the completion of the constant position transmission mode of the TPMS sensor 2.

In order to transmit the TPMS data upon the TPMS sensor reaching a prescribed position, the gravitational acceleration component must undergo a continuous sampling operation. Further, in order to improve the position accuracy, the sampling period has to be shortened. Thus, the power consumption will increase and the long operating life may not be achieved.

Thus, in the first embodiment, TPMS sensor 2 is configured to detect a gravitational acceleration component at the time of TPMS data transmission at each 10 seconds of time to thereby acquire the rotational position of the TPMS sensor 2 from the gravitational acceleration component for transmission as position information to be added to the TPMS data.

Therefore, since the TPMS sensor 2 monitors only the value of the gravitational acceleration component only at the time of TPMS data transmission, the number of sampling operations will be held small to thereby reduce the power consumption.

Since the gravitational acceleration component changes in a sine waveform, only based on the magnitude of the gravitational acceleration, it is sometimes impossible to identify the position information of the TPMS sensor 2.

Thus, in the first embodiment, TPMS sensor 2 is configured to detect the gravitational acceleration component at a predetermined sampling period immediately before the transmission of the TPMS data. Thus, the direction of change (increase or decrease) in the gravitational acceleration component may be obtained to determine the position of the TPMS sensor 2 based on the magnitude and the direction of change of the gravitational acceleration component. Therefore, the rotational position of the TPMS sensor 2 may be specified accurately.

In the TPMS sensor 2 according to the first embodiment, following effects may be exhibited. In a TPMS sensor 2 (tire air pressure transmission device) installed on the outer periphery of a wheel 1 to transmit tire air pressure information of the wheel 1, provided are a pressure sensor 2a (tire air pressure detection mechanism) that detects a tire air pressure, an acceleration sensor 2b (acceleration detection mechanism) that detects a centrifugal acceleration while the wheel 1 rotates; a sensor control unit 2c (gravitational acceleration component detection mechanism) that determines a rotational position of a TPMS sensor (tire air pressure transmission device) based on a gravitational acceleration component at the time of transmission of the tire air pressure information, and a transmitter 2d (transmitting mechanism) that transmits both the tire air pressure information and the rotational position information of the TPMS sensor 2 in a wireless signal.

Therefore, since TPMS sensor 2 monitors the value of the gravitational acceleration component only at the time of TPMS data transmission, the number of samplings may be maintained small, the detection accuracy of the peak of the gravitational acceleration component is enhanced, and the power consumption may be suppressed.

The sensor control unit 2c is configured to detect a gravitational acceleration component of the centrifugal acceleration at each sampling period before the transmission of the wireless signal by the transmitter 2d to thereby determine the rotational position of the TPMS sensor 2 based on the magnitude and the direction of change in the gravitational acceleration component. In addition, in the tire air pressure monitoring system 13 in the first embodiment, the following effects may be achieved.

In a tire air pressure monitoring system 13 with a TPMS sensor 2 (tire air pressure transmission mechanism) installed on the outer periphery of a wheel 1 to transmit tire air pressure information of the wheel 1 via a wireless signal and a TPMS main part 14 (tire air pressure monitoring main part) installed on a vehicle body for receiving the wireless signal and monitoring the tire air pressure of each wheel, the TPMS sensor 2 is provided with a pressure sensor 2a (tire air pressure detection mechanism) that detects the tire air pressure, an acceleration sensor 2b (acceleration detection mechanism) that detects a centrifugal acceleration while the wheel 1 rotates; a sensor control unit 2c (position determination mechanism) that determines the rotational position of the TPMS sensor 2, and a transmitter 2d (transmission mechanism) that transmits the tire air pressure information and the rotational position information of the TPMS sensor 2 along with identification information unique to each TPMS sensor 2 in a wireless signal, wherein the TPMS main part (tire air pressure monitoring main part) is provided with a receiver 3 (receiving mechanism) that receives the tire air pressure information sent from the transmitter 2d of each TPMS sensor 2 and the rotational position information of the TPMS sensor 2, an ABS control unit 6 (rotational position detection mechanism), and a TPMS control unit 4 (wheel position determination mechanism) that determines the position of the wheel 1 on which the TPMS sensor 2 is installed based on the rotational position of each wheel 1 and the rotational position information of the TPMS sensor 2.

Therefore, since the TPMS sensor 2 monitors the value of the gravitational acceleration component only at the time of TPMS data transmission, the number of samplings may be held small, the detection accuracy of the peal of the gravitational acceleration component may be increased and the power consumption may be suppressed.

The sensor control unit 2c is configured to detect the gravitational acceleration component of the centrifugal acceleration at each set sampling period before the transmission of the wireless signal by the transmitter 2d and to determine the rotational position of the TPMS sensor 2 based on the magnitude and direction of change of the gravitational acceleration component. Therefore, the rotational position of the TPMS sensor 2 may be specified with accuracy.

While best embodiments have been described to implement the present invention, the specific configuration is not limited to these embodiments. Rather, the design change or alterations that do not depart the essence of the present invention may be included in the present invention.

For example, an example of the wheel speed sensor is shown as the rotational position detection mechanism in the embodiments, in a vehicle which is provided with an in-wheel motor as a power source, a resolver of the motor may be used to detect the rotational angle.

The invention claimed is:

1. A tire air pressure monitoring system for monitoring a tire air pressure of each tire comprising:
   a tire air pressure detection mechanism installed on each wheel that detects the tire air pressure;
   an acceleration detection mechanism installed on each wheel that detects a centrifugal acceleration while the wheel rotates;
   a position determination mechanism that detects a position of a gravitational acceleration component, in a sampling time period, of the centrifugal acceleration subject to a varying periodical change along with a rotation of the wheel, wherein the position determination mechanism detects the position of the gravitational acceleration component using two or more samples of the gravitational acceleration component taken, during the sampling time period, immediately before a transmission by a transmitter;
   the transmitter installed on each wheel that transmits, in the transmission, the detected tire air pressure, the position of the gravitational acceleration component, and identification information unique to each transmitter as a wireless signal, wherein the transmitter transmits at fixed time intervals unrelated to the wheel rotation, and wherein each fixed time interval corresponds to a respective sampling time period;
   a receiver installed on a vehicle body to receive the wireless signal;
   a rotational position detection mechanism installed on the vehicle body in correspondence with each wheel to detect the rotational position of the wheel; and
   a wheel position determination mechanism having a learning mode and a monitoring mode, and during the learning mode, the wheel position determination mechanism corrects, to provide a corrected rotational position, the rotational position of each wheel at the time of transmission of the wireless signal including specific identification information by a correction value set in accordance with the position of the gravitational acceleration component superposed on the wireless signal containing the identification information to determine the wheel position of the wheel on which the transmitter is installed based on the corrected rotational position of each wheel, and during the monitoring mode, the wheel position determination mechanism detects the gravitational acceleration component at the time of the transmission of a wireless signal using the corrected rotational position of each wheel from the learning mode.

2. The tire air pressure monitoring system as claimed in claim 1, wherein the gravitational acceleration component varies sinusoidally and the position determination mechanism detects, in the sampling time period, the position of the gravitational acceleration component based on a magnitude and a direction of change of the gravitational acceleration component.

3. The tire air pressure monitoring system as claimed in claim 1, wherein the gravitational acceleration component varies sinusoidally and is divided into zones, each zone corresponding to a magnitude and a direction of change of the gravitational acceleration component, the magnitude having a value ranging from −1[G] to 1[G], and the direction of change is one of increasing and decreasing, wherein the position determination mechanism determines a zone of the zones for the gravitational acceleration component based on a magnitude and a direction of change of the detected gravitational acceleration component of the centrifugal acceleration, when the gravitational acceleration component is between 0.5 [G] and 1 [G] and the direction of change is increasing, the position determination mechanism determines that the zone is a first zone, when the gravitational acceleration component is between 0.5 [G] and 1 [G] and the direction of change is decreasing, the position determination mechanism determines that the zone is a second zone, when the gravitational acceleration component is between 0 [G] and 0.5 [G] and the direction of change is increasing, the position determination mechanism determines that the zone is a third zone, when the gravitational acceleration component is between 0 [G] and 0.5 [G] and the direction of change is decreasing, the position determination mechanism determines that the zone is a fourth zone, when the gravitational acceleration component is between −0.5 [G] and 0 [G] and the direction of change is increasing, the position determination mechanism determines that the zone is a fifth zone, when the gravitational acceleration component is between −0.5 [G] and 0 [G] and the direction of change is decreasing, the position determination mechanism determines that the zone is a sixth zone, when the gravitational acceleration component is between −1 [G] and −0.5 [G] and the direction of change is increasing, the position determination mechanism determines that the zone is a seventh zone, when the gravitational acceleration component is between −1 [G] and −0.5[G] and the direction of change is decreasing, the position determination mechanism determines that the zone is an eighth zone, and wherein the transmitter transmits the wireless signal superimposed with the zone for the gravitational acceleration component as the position of the gravitational acceleration component at the time of transmission of the wireless signal.

4. The tire air pressure monitoring system as claimed in claim 1, wherein the wheel position determination mechanism further determines a vehicle stop determination time each time the vehicle is powered off, wherein the learning mode is initiated upon a start of the vehicle when the vehicle stop determination time is longer than a predetermined period of time and the monitoring mode is initiated upon the start of the vehicle when the vehicle stop determination time is less than the predetermined period of time.

5. The tire air pressure monitoring system as claimed in claim 1, wherein the wheel position determination mechanism is programmed to reduce power consumption by transferring from the learning mode to the monitoring mode when the rotational position of each wheel has been corrected or after a predetermined period of vehicle operation time, whichever occurs first.

* * * * *